3,786,114
THERMALLY STABLE FLAME RETARDANT POLYCARBONATE COMPOSITION CONTAINING IN ADMIXTURE A POLYCARBONATE AND A PHOSPHINIC OR A PHOSPHORIC ACID ADDITIVE
Donald B. G. Jaquiss, New Harmony, and Frank N. Liberti, Mount Vernon, Ind., assignors to General Electric Company
No Drawing. Filed Jan. 3, 1972, Ser. No. 215,153
Int. Cl. C08g *39/10*
U.S. Cl. 260—860                                    8 Claims

ABSTRACT OF THE DISCLOSURE

A thermally stable flame retardant polycarbonate composition having in admixture a flame retardant polycarbonate and an additive which may be either the barium or cadmium salts of either phenyl phosphinic acids or mono- or diphenyl phosphoric acids.

---

This invention is directed to a thermoplastic aromatic polycarbonate composition having excellent resistance to color degradation at elevated temperatures and in particular, to a thermally stable flame retardant aromatic polycarboante composition having in admixture therewith a particular additive, which additive is a derivative of a phenyl phosphinic acid or phenyl phosphoric acid.

BACKGROUND OF THE INVENTION

It is well known in the art to prepare flame retardant polycarbonate compositions by employing halogen substituted bisphenol-A in the preparation thereof. Specifically, U.S. Pat. 3,334,154 discloses such a composition wherein tetrabromobisphenol-A is employed to prepare a polycarbonate composition having excellent flame retardant properties. Flame retardant properties of thermoplastic compositions are extremely high in demand in the industry as a safety feature requirement. In fact, many applications for thermoplastics carry the requirement that the thermoplastic be flame retardant, particularly where they are used by the public or are employed in areas where the public may gather.

As thermoplastics, particularly polycarbonates, find greater use in many new applications. There is a definite trend to higher molding temperatures due to the complicated geometry of the part to be molded and/or the molding of thin walled sections. Higher molding temperatures are necessary in order for the polycarbonate to completely fill the mold cavity and thereby produce a satisfactory molded shape even though complicated in its design. Unfortunately, when employing flame retardant polycarbonate compositions, as described by the prior art, color degradation of the flame retardant polycarbonate composition occurs due to these higher molding temperatures being employed.

DESCRIPTION OF THE INVENTION

It has now been discovered that by incorporating a particular additive with a flame retardant aromatic polycarconate composition, the polycarbonate composition has excellent resistance to color degradation at elevated temperatures. Specifically, the amount of the adidtive employed may range anywhere from 0.05 to about 2.0 and preferably 0.1–1.0 weight percent of the additive based on the weight of the total polymer composition. More specifically, the additive employed herein may be either the barium or cadmium salt of an unsubstituted or substituted phenyl phosphinic acid or unsubstituted or substituted mono- or diphenyl phosphoric acid or mixtures thereof. The substitution in the phenyl ring of either of the salts of the phosphinic or phosphoric acids may be either the mono-, di- or trichloro or corresponding bromo substitution. Preferably, the substitution on the phenyl ring in either case is the trichloro substitution.

It is believed that color degradation as exhibited by streaking of the molded part is due to the thermal instability of the flame retardant composition when exposed to the elevated temperatures during molding. As stated previously, it has now been discovered that this streaking effect or thermal instability can now be relieved or reduced by incorporating the particular additive disclosed above with the flame retardant polycarbonate composition.

The flame retardant polymer employed herein is a carbonate polymer consisting of either (1) a blend of a polymer of an unsubstituted dihydric phenol with the balance being a copolymer of a halogen substituted dihydric phenol and an unsubstituted dihydric phenol or (2) a copolymer of an unsubstituted dihydric phenol and a halogen substituted dihydric phenol. Preferably, the blend may be 30–99 weight percent and more particularly 70–99 weight percent of a homopolymer of an unsubstituted dihydric phenol such as 2,2-bis(4-hydroxyphenyl) propane (bisphenol-A) and correspondingly 70–1 weight percent and more particularly, 30–1.0 weight percent of a copolymer of (1) 75–25 weight percent of an unsubstituted dihydric phenol such as bisphenol-A and, correspondingly, (2) 25–75 weight percent of a halogen substituted dihydric phenol such as 2,2-(3,3′,5,5′-tetrabromo-4,4′-dihydroxy-diphenyl) propane (tetrabromobisphenol-A). Preferably, the copolymer when employed herein may be the same as employed with blend.

DESCRIPTION OF THE PREFERRED EMBODIMENTS

The following examples are set forth to illustrate more clearly the principles and practice of this invention to those skilled in the art. Unless otherwise specified, where parts or percents are mentioned, they are parts or percents by weight.

Example I

A molding composition is prepared by mixing (a) one part of a copolymer prepared by reacting fifty weight percent of 2,2-bis(4-hydroxyphenyl) propane, 50 weight percent of 2,2-(3,3′,5,5′-tetrabromo-4,4′-dihydroxy-diphenyl) propane and phosgene in a methylene chloride reaction medium containing therein p-tertiary butylphenol, pyridine and calcium hydroxide, and (b) four parts of a bisphenol-A homopolymer prepared by reacting bisphenol-A with phosgene in a methylene chloride reaction medium containing therein triethylamine, p-tertiarybutylphenol and calcium hydroxide. The polymer blend is then extruded at a temperature of about 525° F. The extrudate is comminuted into pellets. The above composition is then injection molded into specimens of 3″ x 2″ x 0.125″ thick at a molding temperature of 710° F.

Severe color degradation occurs as observed by dark streaks appearing in the molded shape, In addition, the molded specimens break as they are ejected from the mold indicating that the specimens are brittle.

Example II

Example I is repeated except that about 0.70 weight percent of cadmium bis(2,4,6-trichlorophenyl) phosphate is added to the polymer composition.

The composition is then extruded and molded under the same conditions as in Example I.

The molded specimens do not break upon ejection from the mold and no color degradation is observed.

Example III

Example II is repeated except that the additive employed herein is 0.50 of barium phenylphosphinate instead of 0.70 of the cadmium salt employed in Example II.

The results obtained are essentially the same.

Example IV

Example II is repeated except that the molding temperature employed herein is 740° F.

The results obtained are essentially the same.

Example V

Example III is repeated except that the additive employed herein is a mixture of the cadmium salt of monophenyl phosphoric acid and cadmium salt of diphenyl phosphoric acid.

The results obtained are essentially the same as in Example III.

As shown in the examples by merely adding the above described additive to a flame retardant polycarbonate composition, a composition is obtained which is color stable at elevated temperatures. This is evidenced by the fact that no streaking occurred at the higher molded temperatures while when employing the flame retardant polycarbonate composition alone, severe streaking occurred at molding temperatures as low as 710° F. and even as low as 680° F. The streaking is a definite indication of thermal instability occurring in the flame retardant composition when such compositions are subjected to elevated temperatures. The mere addition of these minor amounts of additives eliminates this streaking and stabilizes the flame retardant carbonate composition against thermal degradation at elevated temperatures. In addition as also shown in the examples, brittleness is also greatly reduced when employing the additive mixture of this invention.

In general, in the practice of this invention, the unsubstituted and halogen substituted dihydric phenols employed herein are the dihydric bisphenols or polynuclear aromatic compounds, containing as functional groups, two hydroxyl radicals, each of which is attached directly to a carbon atom of an aromatic nucleus. Typical of some of the dihydric phenols that may be employed herein are dihydric phenols such as bis(4-hydroxyphenyl) methane,
2,2-bis(4-hydroxyphenyl) propane,
2,2-bis(4-hydroxy-3-methylphenyl) propane,
4,4-bis(4-hydroxyphenol) heptane,
2,2-bis(4-hydroxy-3,5-dichlorophenyl) propane,
2,2-bis(4-hydroxy-3,5-dibromophenyl) propane, etc., dihydric phenol ethers such as bis(4-hydroxyphenyl) ether, bis(3,5-dichloro-4-hydroxyphenyl) ether, etc., dihydroxydiphenols such as p,p'-dihydroxyphenyl, 3,3'-dichloro-4,4'-dihydroxydiphenyl, etc., dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy - 2,5 - dichlorobenzene, 1,4-dihydroxy-3-methylbenzene, etc., and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available to provide carbonate polymers and are disclosed in U.S. Pats. 2,999,835, 3,028,365 and 3,153,008.

Generally, the polycarbonate employed herein may be prepared by reacting a dihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A thermally stable polycarbonate composition consisting of in admixture an aromatic polycarbonate and 0.05 to about 2.0 weight percent of an additive selected from the group consisting of the barium and cadmium salts of unsubstituted and chloro or bromo substituted phenyl phosphinic acids and unsubstituted and chloro or bromo substituted mono- and diphenyl phosphoric acids, and mixtures thereof; said aromatic polycarbonate being selected from the group consisting of (1) a copolymer of an unsubstituted dihydric phenol and a halogen-substituted dihydric phenol and (2) a blend consisting of (1) with a homopolymer of an unsubstituted dihydric phenol; said halogen being selected from the group consisting of bromine and chlorine.

2. The composition of claim 1 wherein the aromatic polycarbonate is a mixture of 30–99 weight percent of a homopolymer of a dihydric phenol and, correspondingly, 70–1 weight percent of a copolymer of 25–75 weight percent of a dihydric phenol and 75–25 weight percent of a tetrahalogenated dihydric phenol.

3. The composition of claim 1 wherein the substituted phenyl phosphinic acid is trichlorophenyl phosphinic acid.

4. The composition of claim 1 wherein the substituted diphenyl phosphoric acid is bis(2,4,6 - trichlorophenyl) phosphoric acid.

5. The composition of claim 1 wherein the additive is cadmium bis(2,4,6-trichlorophenyl) phosphate.

6. The composition of claim 1 wherein the additive is barium phenyl-phosphinate.

7. The composition of claim 1 wherein the dihydric phenol is 2,2-bis(4-hydroxyphenyl) propane.

8. The composition of claim 1 wherein the halogen substituted dihydric phenol is 2,2-(3,3',5,5'-tetrabromo-4,4'-dihydroxy-diphenyl) propane.

References Cited
UNITED STATES PATENTS

| | | | |
|---|---|---|---|
| 3,597,390 | 8/1971 | Miller | 260—45.7 |
| 3,594,347 | 7/1971 | Lazarus et al. | 260—45.75 |
| 3,334,154 | 8/1967 | Kim | 260—860 |
| 3,647,747 | 3/1972 | Bialous | 260—860 |
| 3,577,381 | 5/1971 | Stewart et al. | 260—45.7 |

WILLIAM H. SHORT, Primary Examiner

E. WOODBERRY, Assistant Examiner

U.S. Cl. X.R.

260—45.7 P, 45.75 R, 45.85